UNITED STATES PATENT OFFICE.

WILLIAM N. BLAKEMAN, JR., OF MOUNT VERNON, NEW YORK.

PIGMENT COMPOSITION FOR PAINTS.

1,423,391. Specification of Letters Patent. Patented July 18, 1922.

No Drawing. Application filed October 5, 1921. Serial No. 505,625.

*To all whom it may concern:*

Be it known that I, WILLIAM N. BLAKEMAN, Jr., a citizen of the United States, and resident of the city of Mount Vernon, in the county of Westchester and State of New York, have invented a new and useful Pigment Composition for Paints, which invention is fully set forth in the following specification.

The object of this invention is to improve the spreading power of all pigments—especially the anhydrous pigments—and, at the same time, increase the permanency of the paint which may be formed therewith.

Most of the anhydrous pigments—that is pigments which carry no combined water—are deficient in spreading power, as compared with Dutch white lead, when ground in the usual oil-vehicle; but I have discovered that, if the pigment be first ground to paste form in a non-drying vegetable oil or fat which has a high resistance to hydrolysis, and this paste, or magna, be subsequently extended in the oil-vehicle, the spreading power of the pigment will be very greatly improved, and, at the same time, the resulting paint will be found more resistant to atmospheric and abrasive influences.

The oils or fats which I employ are those non-drying vegetable fatty oils which have a high resistance to hydrolytic action, and I prefer either cocoanut oil or palm-kernel oil. These oils, which are flowing oils at summer heats, but chill to a solid or semi-solid condition at somewhat lower temperatures, are congruent to nearly all oils, drying, semi-drying and non-drying, and can be used as a factor in oil-vehicles formed therewith, and will not cloud, flock, or chill out therefrom.

Owing to its abundance on the market, I prefer to use cocoanut oil, and this, or other equivalent oil, may be employed in any condition whether liquid, semi-solid or solid. The proportion to be used will depend upon the character of the pigment and of the vehicle in which the paste is to be subsequently extended.

As examples of anhydrous pigments, I select the pigments now found on the market under the names of "zinc lead" and "leaded zinc," which are composed of zinc oxide and lead sulphate, the lead sulphate ranging from 5%, through various classifications, up to 40%. Into one part of cocoanut oil, I grind 600 to 700 parts of the 40% grade of zinc-lead, preferably adding the pigment in cumulative charges and thereby obtaining a more uniform and homogeneous product. Of the less expensive lithopone pigment, 300 parts may be used to one part of cocoanut oil. The paste, or magma, thus produced, can be placed upon the market in the same manner as Dutch white lead is now sold in oil, and when desired for use, can be extended in any suitable oil-vehicle. The paint composition so produced, will be found to possess great spreading power and to exhibit increased resistance to deteriorating influences.

If desired, a percentage of tung oil may be used with the cocoanut oil in the formation of the paste, thereby increasing the drying properties of the ultimate paint-composition. The tung oil will also act as a solvent for the cocoanut oil when in a semi-solid or solid condition.

While my invention is particularly applicable to anhydrous pigments, Dutch white lead may be treated in the same manner by associating with it a small proportion of an anhydrous pigment such as zinc oxide, zinc lead, or lithopone, with a very decided increase in the permanency of the finished paint.

It will, of course, be understood that by the term "oil" as used in this specification and in the claims to designate the vegetable oils and fats which have a high resistance to hydrolysis, I intend to cover the use of such substances, whether they are in a liquid, semi-solid, or solid, condition at the time of use.

The mixture of non-drying vegetable fatty oils having a high resistance to hydrolysis, with other fatty oils is broadly claimed in my application No. 505626 filed herewith; the use of such oils in paint-compositions is broadly claimed in application No. 505624 filed herewith; and the use of such oils in paint-vehicles is specifically claimed in application No. 461,961, filed April 16, 1921.

Having thus fully described my invention, I claim:

1. A mixture, in paste form, of a non-drying vegetable fatty oil of high resistance to hydolysis, and a pigment.

2. A mixture, in paste form, of a non-drying vegetable fatty oil of high resistance to hydrolysis, and an anhydrous pigment.

3. A mixture, in paste form, of a non-drying vegetable fatty oil of high resistance to hydrolysis; tung oil; and a pigment.

4. A mixture, in paste form, of a non-drying vegetable fatty oil of high resistance to hydrolysis; tung oil; and an anhydrous pigment.

5. A mixture, in paste form, of cocoanut oil and a pigment.

6. A mixture, in paste form, of cocoanut oil and an anhydrous pigment.

7. A mixture, in paste form, of cocoanut oil; tung oil; and a pigment.

8. A mixture, in paste form, of cocoanut oil; tung oil; and an anhydrous pigment.

WM. N. BLAKEMAN, Jr.